United States Patent [19]
Jenkins et al.

[11] Patent Number: 6,099,156
[45] Date of Patent: Aug. 8, 2000

[54] THIN LIGHT MANAGING SYSTEM FOR DIRECTING AND DISTRIBUTING LIGHT FROM ONE OR MORE LIGHT SOURCES AND METHOD FOR MAKING OPTICS STRUCTURES FOR USE IN THE SYSTEM

[75] Inventors: David Jenkins; Robert Pagano; Kevin Garcia, all of Tucson, Ariz.; Robert Passera, Bradford, Canada; Joseph A. Griffin, White Lake, Mich.; Gerhard F. Hirmer, Aurora, Canada

[73] Assignee: Decoma International Inc., Concord, Canada

[21] Appl. No.: 09/131,003

[22] Filed: Aug. 7, 1998

Related U.S. Application Data
[60] Provisional application No. 60/054,953, Aug. 7, 1997.

[51] Int. Cl.$^7$ ....................................................... B60Q 1/00
[52] U.S. Cl. ............................... 362/511; 362/31; 362/32; 362/554; 362/540
[58] Field of Search ................................... 362/511, 540, 362/31, 554, 559, 543, 544

[56] References Cited

U.S. PATENT DOCUMENTS

| | | | |
|---|---|---|---|
| 4,811,172 | 3/1989 | Davenport et al. | 362/61 |
| 4,929,866 | 5/1990 | Murata et al. | 313/500 |
| 5,097,396 | 3/1992 | Myers | 362/32 |
| 5,174,649 | 12/1992 | Alston | 362/244 |
| 5,197,792 | 3/1993 | Jiao et al. | 362/31 |
| 5,347,435 | 9/1994 | Smith et al. | 362/80.1 |
| 5,434,754 | 7/1995 | Li et al. | 362/31 |
| 5,436,809 | 7/1995 | Brassier et al. | 362/61 |
| 5,490,048 | 2/1996 | Brassier et al. | 362/238 |
| 5,490,049 | 2/1996 | Montalan et al. | 362/240 |
| 5,506,929 | 4/1996 | Tai et al. | 385/146 |
| 5,594,424 | 1/1997 | Louy et al. | 340/815.54 |
| 5,700,078 | 12/1997 | Fohl et al. | 362/32 |
| 5,971,578 | 10/1999 | Fohl et al. | 362/581 |

FOREIGN PATENT DOCUMENTS
0587501 of 1993 European Pat. Off. .

OTHER PUBLICATIONS
TIR Technologies, Inc., "Miniaturized TIR Lenses For Light Emitting Diodes", 1992, pp. 1–15.
TIR Technologies, Inc., "Innovative High–Efficiency Fiber Optic Illuminator Using The Convering TIR Lens", 1993, pp. 1–9.
TIR Technologies, Inc., "Linear TIR Lenses For Fluorescent Light Sources", 1994, pp. 1–9.
Parkyn et al., "The Converging TIR Lens For Non–Imaging Concentration of Light From Compact Incoherent Sources", 1993, pp. 1–10.

*Primary Examiner*—Sandra O'Shea
*Assistant Examiner*—Anabel Ton
*Attorney, Agent, or Firm*—Howard & Howard

[57] ABSTRACT

A rear signal lamp of an automotive vehicle comprising a lamp housing and a curved cover lens for enclosing a thin light managing system. The thin light managing systems includes a plurality of backlight light-emitting diodes mounted in a light mounting substrate and secured to the lamp housing. A control module operatively connected to the light-emitting diodes for controlling the operation and illumination of the light-emitting diodes. A reflector matrix having a plurality of reflector cones corresponding to each of the light-emitting diodes in the mounting substrate and a hybrid optics panel having a direct lensing section covering the reflector matrix and light-emitting diodes and a double redirecting light pipe section surrounding the lensing section. A single light-emitting diodes is coupled along spaced apart quadrants of the redirecting light pipe. Each single light-emitting diodes emits light to the respective quadrant of the optics panel which is reflected and redirected from one or more lens facets to illuminated the front surface of the panel. The direct lensing section and redirecting light pipe illuminate distinct area on the curved cover lens.

22 Claims, 8 Drawing Sheets

THIN LIGHT MANAGING SYSTEM FOR DIRECTING AND DISTRIBUTING LIGHT FROM ONE OR MORE LIGHT SOURCES AND METHOD FOR MAKING OPTICS STRUCTURES FOR USE IN THE SYSTEM

RELATED APPLICATION

This patent application claims priority to and all the benefits of U.S. Provisional patent application Ser. No. 60/054,953, filed on Aug. 7, 1997 and entitled "Thin Light Managing System for Directing and Distributing Light from one or more Light Sources and Method for Making Optics Structures for use in the System".

FIELD OF THE INVENTION

The subject invention relates to a thin light managing system, and more particularly, to a thin light managing system for redirecting and redistributing light from one or more light sources.

BACKGROUND OF THE INVENTION

Conventional light managing systems for automotive vehicle headlights, sidelights and taillights typically include a bulb filament recessed in a reflector housing behind a cover lens. The light emitted from the bulb filament is reflected from the reflector housing outwardly through the cover lens to form a beam or planar light image. The cover lens shapes the light into the desired pattern, i.e., focused headlight beam or pattern side or rear signal. However, conventional bulb and reflector lighting systems are disadvantageous in terms of styling and size flexibility. The bulb and reflector require a significant depth and width to acquire desired focus and light dispersion through the cover lens, thus, limiting the ability to streamline and contour the light system.

Other systems have been developed to provide alternatives to the conventional bulb filament and reflector system utilizing a light pipe and collimator to direct the light to a reflective emitter having a plurality of lens facets to redirect the light in the desired path and pattern. These systems are exemplified in U.S. Pat. Nos. 5,434,754 to Li et al., issued Jul. 18, 1995 and 5,197,792 to Jiao et al., issued Mar. 30, 1993.

However, there is still a need for an efficient, thin light managing system which provides the flexibility of coupling a variety of light emitting arrangements for both direct lighting and redirected lighting by combining the use of direct lensing and light pipe optics having redirecting facets to achieve a desired light distribution and pattern.

SUMMARY OF THE INVENTION

The present subject matter relates, in part, to a system for redirecting and/or redistributing light from one or more light sources to provide lighting design flexibility and to accommodate lighting packaging restrictions. The system employs a unit cell approach whereby one or more light sources, preferably light emitting diodes, or LEDs, are coupled with an optics structure. A plurality of unit cells, which may be of either a lensing or light pipe variety, can be coupled in a variety of arrangements to achieve the desired light distribution and intensity patterns.

The lensing unit cells employ a lensing structure whereby light incident upon the unit cell is transmitted directly there through, typically after having been reconditioned in some fashion. Examples include Fresnel, concave, or convex lens structures. A unique dual surface lens element employing spherical and cylindrical surfaces, a specially tailored Fresnel lens element, and a combination Fresnel/pillow lens element for achieving desired light distributions are disclosed.

Light pipe unit cells include a light transmitting structure that redirects and redistributes light incident thereupon, typically by employing light coupling optics and redirecting facets formed on a surface of the structure.

The system is particularly advantageously adapted to vehicle signal lamp applications. For example, signal lamp intensity distribution requirements in the United States are defined by Federal Motor Vehicle Safety Standard ("FMVSS") No. 108. FMVSS 108 is consistent with other regional standards and unique customer requirements. Unit cells can be constructed, configured, and oriented so as to meet any of these requirements for substantially any given signal lamp size, shape, or configuration in a mechanically robust structure. In addition, the design and packaging flexibility afforded by the present system can provide the opportunity to improve upon conventional vehicle signal lamp configurations.

The system is particularly thin. It may be employed in packaging configurations ranging from around 25–50 mm. The flexibility afforded by the unit cell approach simplifies packaging in vehicles and allows for lighting design and packaging variations, e.g., signal lamps with surface curvatures.

The system is cost effective because the unit cell approach simplifies lighting design; each unit cell constitutes an optical design element which may be advantageously varied and configured with other such design elements to cost effectively achieve a desired light intensity distribution.

Advanced light sources, such as LEDs, are cooler, consume less power, and are more reliable and durable than conventional filament light elements. Moreover, LEDs reach full light intensity virtually instantaneously, whereas conventional filament light elements take a finite period of time to reach full intensity. An automobile traveling at highway speeds will travel a significant distance in the time it takes the filament element to reach full intensity. Accordingly, when incorporated in vehicle signal lamps, such as brake lights, LEDs provide safety advantages because they can deliver the "brake signal" more quickly than signal lamps employing conventional filament-based lighting elements.

The light management system employing unit cells enable styling enhancements such as logos', decals, or script. In addition, the unit cell approach enables the creation of unique illuminated appearances, or patterns, not possible or practical with conventional light sources and associated optics.

A variety of different types of unit cells may be combined to achieve a desired design and intensity distribution or to meet packaging restrictions. The resulting optics structure, which may comprise a variety of optic shapes and surfaces, is preferably formed from an optics grade plastic material.

According to another aspect of the present invention, plastic optics structures can be formed by a unique injection-compression molding technique. One or more molding parts define an injection cavity and each molding part may include a movable surface portion for compressing material within that molding part. Each compressible molding part is preferably independently controlled so as to apply a specified amount of force, to compress a specified distance, and to compress for a specified duration of time.

A molding assembly according to the present invention, comprising one or more such independently controlled compressible mold parts, enables the molding of optics structures having complicated geometries, including thick and thin portions in the same relative area and significant transitions from one geometry to the next, with true and accurate surfaces. Accordingly, the complicated optics structures of the present invention can be economically produced, even for the high volumes required for the auto industry, with great accuracy. Thus, the optics system of the present invention represents a commercially viable improvement in lighting technology.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

For convenience in the following description, various directional or other spatial references are made with regard to the orientation of structure(s) shown in the drawings. It is understood, however, that such references, including, without limitation, upper, lower, top, bottom, front, back, left, right, vertical, horizontal, lateral, or longitudinal, are made for convenience only and should not necessarily be construed to be limiting on the invention described herein.

Figure 1:
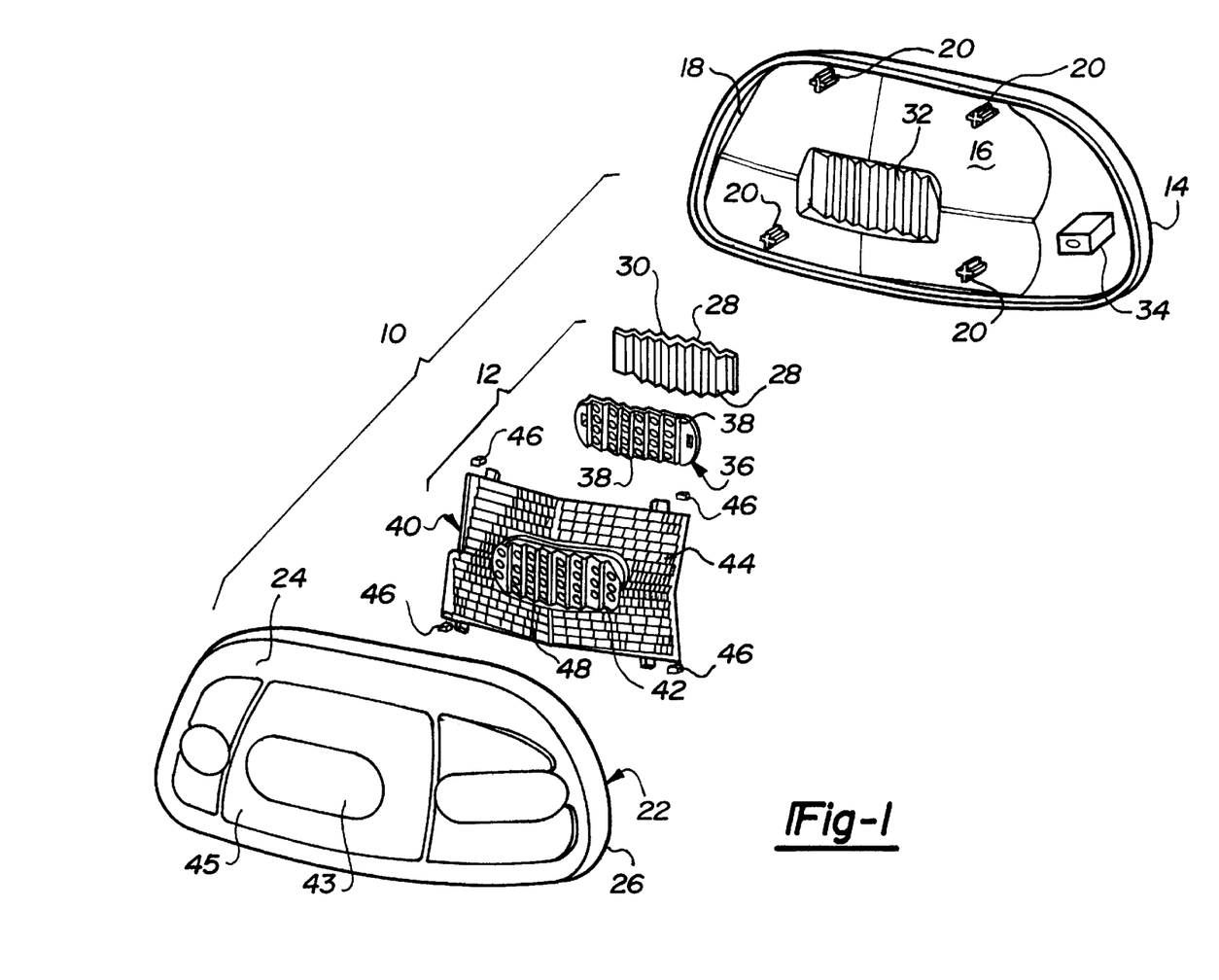
FIG. 1 is an exploded perspective view of a vehicle rear signal lamp employing a thin light managing system embodying aspects of the present invention.

Although the thin light-managing system of the present invention may be advantageously used in any application where a thin lighting structure profile is important, where design flexibility is important, and/or where a surface is to be illuminated, the present invention is shown in FIG. 1 for purposes of illustration in terms of its advantageous use within a rear signal lamp of a vehicle. The thin light-managing system of the present invention finds particular application within vehicle signal lamps because of the benefits afforded by the thin profile of the system, the design flexibility in terms of possible surface shapes of the illuminated surface as well as flexibility in lighting design, the improved reliability, durability and quality of lighting provided by the system, and the reduced power consumption of the present system.

Referring to the Figures, wherein like numerals indicate like or corresponding parts throughout the several views, a rear signal lamp for a vehicle is generally shown at reference number 10 in FIG. 1. The signal lamp 10 includes a thin light-managing system 12 embodying aspects of the present invention. The signal lamp 10 further includes a lamp housing 14, preferably composed of a molded plastic, having a back wall 16 and a peripheral edge wall 18 extending transversely from the back wall 16 and a plurality of mounting clips 20 for mounting elements of the lighting structure into the housing 14. The signal lamp 10 also preferably includes a cover lens 22 having a curved front surface 24 and a peripheral edge 26. The cover lens 22 is preferably composed of a molded plastic and includes portions which are substantially translucent and which may also be colored. The cover lens 22 may be of conventional design for a vehicle rear signal lamp. The light-managing system 12 is housed in an envelope formed between the lamp housing 14 and the cover lens 22, and the entire lamp 10 may be mounted at the rear of a vehicle.

The light-managing system 12 illustrated in the Figures includes a plurality of backlight light-emitting diodes (LEDs) 28 which are mounted in an LED mounting substrate 30 forming an array of LEDs. In addition to providing an LED mounting structure, substrate 30 may also function to transmit power to the LED array and to conduct heat away from the LED array. The specific structure shown is similar to a product manufactured by the Hewlett-Packard Company and sold under the trade name Snap LED, which is the preferred LED array and substrate. In the embodiment shown, the LED mounting substrate 30 is formed in a stair-step fashion so as to accommodate the curvature of the signal lamp 10. Note that the back wall 16 of lamp housing 14 preferably includes a corresponding step-shaped backing section 32 for accommodating the step-shaped mounting substrate 30. The step-shaped backing section 32 creates intimate contact between the LED substrate 30 and the plastic housing 14 to more efficiently conduct heat away from the LEDs 28, thus improving the thermal characteristics of the system which results in improved LED performance.

The signal lamp system 10 may also include an LED electronics control module generally designated at 34. The LED electronics control module 34 includes electronics and related packaging components that are configured to operate the LEDs 28 in the required or desired manner. This operation may be to turn the LEDs on or off or to control the intensity of the LEDs for a desired lighting signal. The operation may also be to control individual LEDs or groups of LEDs to achieve a particular styling or appearance objective. In addition, the control module 34 may be used to manage the amount of current going to the LEDs as a function of ambient operating conditions in order to ensure proper operation and reliability under certain operationally stressful conditions or to maximize efficiency and performance under more normal operating conditions. The electronics control module 34 may be configured in different ways in order to mount the module 34 inside the lamp housing 14, as shown in FIG. 1, or to mount the module 34 outside the lamp housing 14, as dictated by requirements and restrictions such as performance requirements and packaging space limitations.

The LED mounting substrate 30 having the plurality of LEDs 28 mounted therein is coupled with a reflector matrix 36 having a plurality of reflector cones 38 corresponding in number and position to each of the LEDs 28 mounted in the LED mounting substrate 30.

The light-managing system 12 further includes a hybrid optics panel 40, the details of which will be described below. The hybrid optics panel 40 shown in FIGS. 1 and 5 includes a direct lensing section 42, having a generally elliptical shape, and a double redirecting light pipe section 44 surrounding the lensing section 42 to form a contoured solid body corresponding to the curved front surface 24 of the cover lens 22. The hybrid optics panel 40 is preferably formed of molded acrylic/PMMA, but may, alternatively, be formed from a polycarbonate. The preferred molding process for forming the hybrid optics panel 40 will be described in detail herein below. Disposed at each of the four corners of the hybrid optics panel 40 are individual LEDs 46, each of which is coupled with one quadrant of the double redirecting light pipe section 44 of the optics panel 40. Light emitted by each of the corner LEDs, or diodes, 46 is coupled into its respective quadrant of the double redirecting light pipe section 44, and the light is redirected and redistributed so that the light emitted from the LEDs 46 at the corners is emitted from the front surface of the panel 40 as a relatively large, generally surface illumination.

Although it is preferred to employ LEDs as a light source, other light sources, such as, for example, gas discharge or fiber optic light sources, may be used. The combination of an individual LED, or other suitable light source, with a particular optics structure, be it a redirecting light pipe structure or one or more directly transmitting lenses, is known as a unit cell.

The LED mounting substrate 30 and reflector matrix 36 are positioned directly behind the direct lensing section 42 of the optics panel 40. The lensing section 42 may comprise a plurality, or array, of individual lenses 48 which correspond in number and position with the reflector cones 38 and LEDs 28. Light emitted from the LEDs 28 is passed directly through the lenses 48 of the lensing section 42 so as to be emitted from the surface of the optics panel 40.

Figures 2, 3, 4:
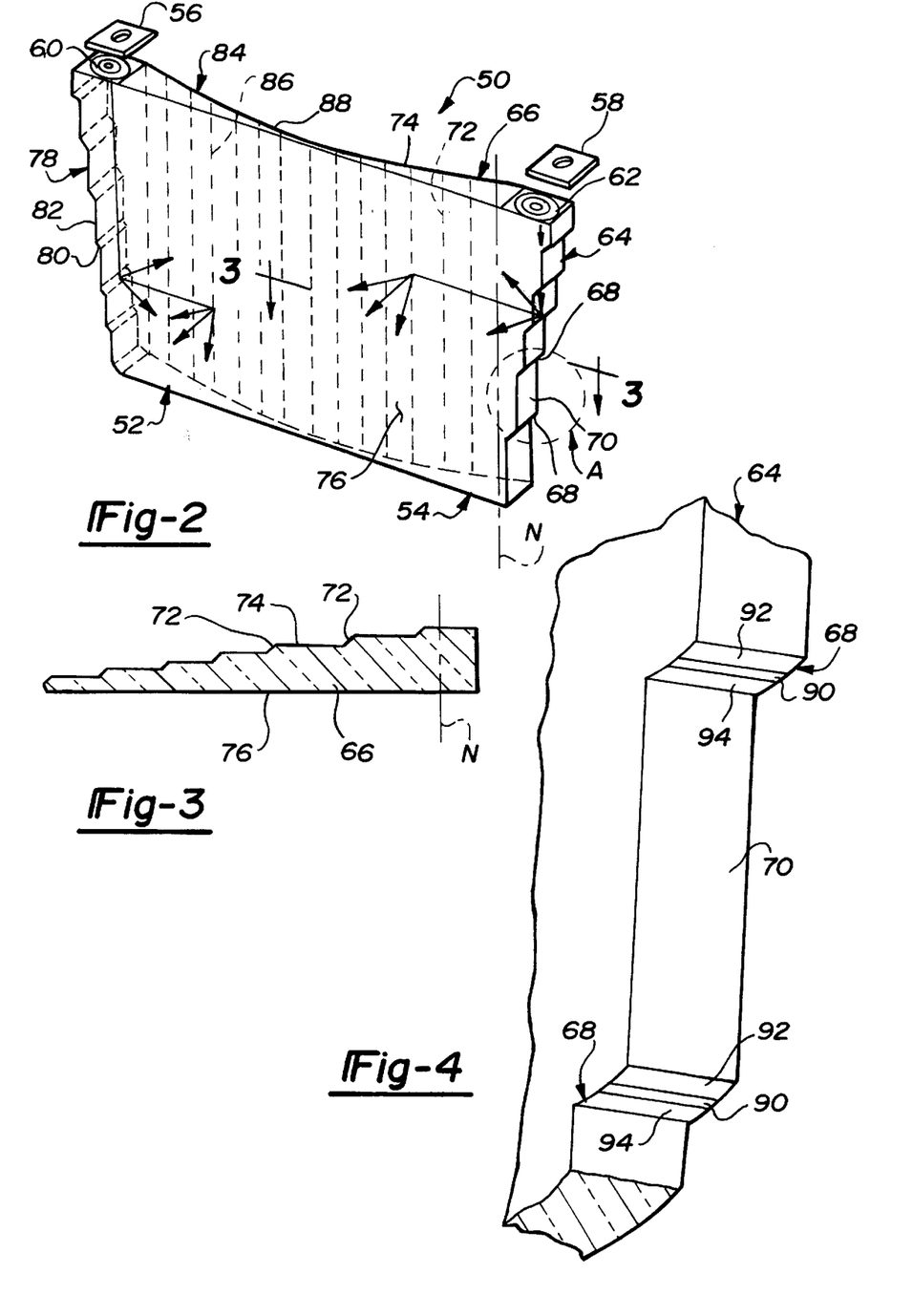
FIG. 2 is a perspective view of a double redirecting light pipe section of a thin light-managing system embodying aspects of the present invention.
FIG. 3 is a partial cross-section taken along the line 3—3 of FIG. 2.
FIG. 4 is an enlarged and partially rotated view of area A in FIG. 2.

Details of the operation of a simplified double redirecting unit cell will be explained with reference to the exemplary unit cell shown in FIGS. 2–4. FIG. 2 illustrates a general double redirecting light pipe at 50 comprising two unit cells 52 and 54, wherein unit cell 52 comprises the left half of the light pipe section 50, and unit cell 54 comprises the right half of the light pipe section 50. Each unit cell 52, 54 has associated therewith LEDs 56 and 58, respectively, positioned above a coupling optics lens 60, 62 formed in each respective unit cell 52, 54. Referring to unit cell 54 for purposes of illustration, unit cell 54 includes a first light redirecting structure 64, also known as a "total internal reflection or TIR" section, and a second light redirecting structure 66, also known as an extraction section. For clarity in FIG. 2, reference line "N" separates first light redirecting structure 64 from second light redirecting structure 66. First and second light redirecting structures 64 and 66 are preferably integrally formed with one another.

First light redirecting structure, or TIR section, 64 presents a generally elongated vertical wedge shaped structure with a plurality of facet-defining steps formed along the outer marginal surface thereof. The facet-defining steps define light redirecting facets 68 separated by flat sections 70 of variable length.

Referring to FIG. 3, the second light redirecting structure, or extraction section, 66 presents a panel structure having a generally laterally extending elongated wedge-shaped cross section. A second plurality of facet-defining steps are formed along the angled outer surface of the wedge. The second facet-defining steps also define light redirecting facets 72 separated by flat sections 74 of variable length. The light pipe 50 further includes a front surface 76 preferably presenting a generally flat illumination surface to each unit cell 52, 54.

Similarly, unit cell 52 also includes a first light redirecting structure 78 having light-redirecting facets 80 separated by straight flat sections 82 of variable lengths and a second light redirecting structure 84 having light-redirecting facets 86 separated by straight flat sections 88 of variable length.

FIG. 4 shows an enlarged area indicated at A of the unit cell 54 of FIG. 2. Referring to FIG. 4, the light redirecting facets 68 of the first light redirecting structure 64 preferably have a shape defined by central flat portion 90 extending in a generally parallel relationship with respect to the side edge of the light redirecting facet 68 and surrounded on either side by curved portions 92, 94, which preferably define portions of arcs. Curved portions 92, 94 preferably define portions of distinct arcs, but may define portions of a common circular arc. This shape of each light-redirecting facet 68 spreads light reflected therefrom in a desired manner to be described below. The redirecting facets 72 of the second light redirecting structure 66 are preferably also shaped in a similar manner.

Therefore, as shown in FIG. 2, LED 58 emits light into the coupling optics lens 62 of the unit cell 54. The coupling optics lens 62 is preferably a Fresnel lens with constant focal length to collimate the light from LED 58. The light cone emitted by LED 58 is transmitted by the coupling optics lens 62 into the first light redirecting structure 64. A portion of the light from the LED 58 is represented schematically by bold lines with arrows.

Light is transmitted through the first light redirecting structure 64 until it contacts one of the plurality of redirecting facets 68 formed along the outside marginal edge of the light redirecting structure 64. Much of the light which contacts flat sections 70 before contacting a redirecting facet 68 is transmitted by total internal reflection back into the first light redirecting structure 64. Accordingly, the structure 64 is an efficient light transmitting body. As represented by the arrows, light which contacts a redirecting facet 68 is spread vertically and redirected laterally along a predetermined first pattern by redirecting facet 68 into the second light redirecting structure, or extraction section, 66.

The operation of a structure similar to the first light redirecting structures having a plurality of flat redirecting facets is described in U.S. Pat. No. 5,434,754 to Li et al., the disclosure of which is hereby incorporated by reference into this specification.

Light reflected laterally by one of the redirecting facets 68 of the first redirecting structure 64 into the second light redirecting structure 66 is transmitted through the second light redirecting structure 66 until it encounters one of the plurality of extracting facets 72 whereupon the light is spread horizontally and again redirected laterally, i.e., extracted, along a predetermined second pattern by facet 72 through the front illumination surface 76 of the light pipe 50. Much of the light transmitted through second light redirecting structure 66 which contacts flat sections 74 or illumination surface 76 before contacting an extracting facet 72 is directed by total internal reflection back into the light redirecting structure 66. Accordingly, the second light redirecting structure 66 is an efficient light transmitting body, and thus, light from a single LED 58 can be redirected and redistributed so as to be emitted as a relatively large, generally surface illumination from the illumination surface 76 of the light pipe 50. The unit cell 52 is essentially a mirror image of unit cell 54, and thus, the light emitted from LED 56 is redirected and redistributed to the front illumination surface 76 similarly to that described above for unit cell 54.

The spreading of the light upon reflection from a light-redirecting facet is caused by the above-described curved-straight-curved surface shape of the facet itself as shown in FIG. 4. It can be appreciated that the amount of light spreading can be controlled by the amount of the facet surface which is curved and by the radius of curvature of the curved portions. If the facet is not curved at all, the reflected light will be redirected with substantially no spreading.

For any given facet, the proportion of the facet surface which constitutes the flat portion, the proportion which constitutes the curved portions, and the radius of curvature of the curved portions may vary from facet to facet, depending on the light spreading result desired. The curved portions or the flat portions may be omitted, i.e., the facet may be entirely flat or entirely curved. The curve may be concave or convex, depending on whether light spreading or light focusing is desired. The shape, size, number, and orientation of all the facets may be varied so that the facets interact to achieve the desired lighting effect most efficiently.

Redirecting facets 68 and 72 may also redirect impinging light by means of total internal reflection. If, however, the amount of reflection provided by total internal reflection is insufficient, some or all facets may be coated with a reflective coating, such as vacuum deposited aluminum. For the vehicle signal lamp application described herein, it is preferable that the facets of the second light redirecting structures 66 and 84 are coated with a reflective material.

Again, the double redirecting light pipe 50 shown in FIG. 2 is essentially symmetrical about a vertical center line, i.e., unit cell 52 is essentially a mirror image of unit cell 54. It will be appreciated, however, that such symmetry is not necessary. For example, the tilt and orientation of each of the unit cells 52 and 54 can be varied substantially to fit packaging constraints and maintain a thin system. Furthermore, the first light redirecting structure 78 of unit cell 52 may have a different number of redirecting facets 80 located at different positions than the facets 68 of first light redirecting structure 64 of unit cell 54. In addition, the second light redirecting structures 66 and 84 of unit cells 54 and 52, respectively, may have differing lengths, numbers, and arrangements of redirecting facets formed thereon.

Also, unit cells 52 and 54 shown in FIG. 2 have second light redirecting structures 84, 66, respectively, which are symmetric from top to bottom. This too is not necessary in the present invention. As shown, for example, in FIGS. 1 and 5, the shape, size, number, and orientation of the facets throughout the second light redirecting structure may be varied in both the horizontal and vertical directions.

The facets of the TIR and extraction sections interact with one another, the facets of the latter receiving, redirecting, and redistributing the light received, redirected, and redistributed by the former to achieve a relatively large surface illumination from a minimum number of light sources most efficiently. It is this ability to vary the shape, size, number, and orientation of redirecting facets in the light redirecting structures which provide the thin light managing system of the present invention with the flexibility to accommodate a variety of lighting design requirements and packaging restrictions.

It should also be appreciated that the first light redirecting structures 64, 78 may include one or more LEDs 56, 58 coupled with corresponding lenses 60, 62 at the distal end of the structures 64, 78 to increase the illumination intensity to the unit cells 52, 54 and panel 50.

Figure 5:
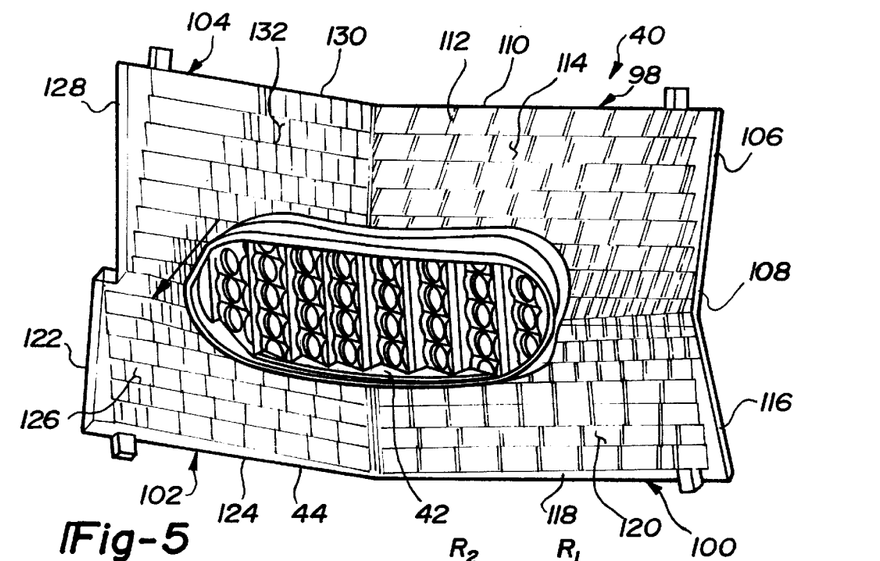
FIG. 5 is a perspective view of a hybrid optics panel of a thin light-managing system embodying aspects of the present invention.

Hybrid optics panel 40 is shown in more detail in FIG. 5. Panel 40 includes a lensing section 42 and a double redirecting light pipe section 44. The double redirecting light pipe section 44 shown in FIG. 5 includes first quadrant 98, second quadrant 100, third quadrant 102, and fourth quadrant 104, which together surround the lensing section 42. First quadrant 98 includes a first light redirecting structure 106 having a plurality of redirecting facets 108, a second light redirecting structure 110 having a plurality of redirecting facets 112, and a front illumination surface 114. Similarly, second quadrant 100 includes first and second light redirecting structures 116, 118 and front illumination surface 120, third quadrant 102 includes first and second light redirecting structures 122, 124 and front illumination surface 126, and fourth quadrant 104 includes first and second light redirecting structures 128, 130 and front illumination surface 132. Further, each of the second 100, third 102 and forth 104 quadrants include facets similar to those shown in the first quadrant 98.

As can be appreciated from FIG. 5, the size, shape, orientation, and number of redirecting facets in the first and second light redirecting structures of the four quadrants 98, 100, 102, and 104, are widely variable so as to accommodate a wide variety of lighting design requirements and packaging limitations. For example, the extracting facets 112 can be oriented to redirect light in a direction not normal to the illumination surface 114. Accordingly, the light output can be directed along a vehicle axis as defined in FMVSS 108.

Figure 6:
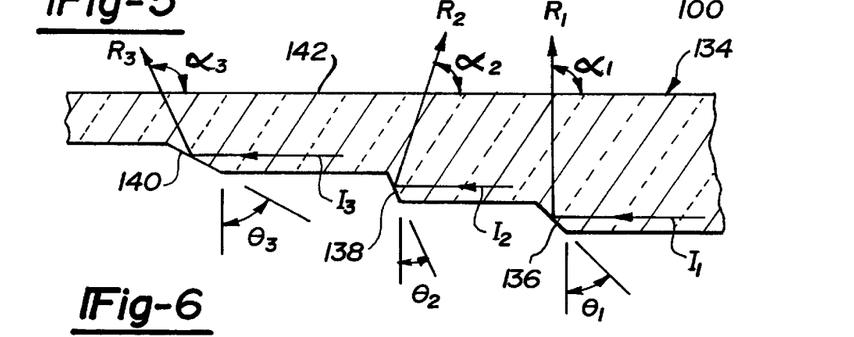
FIG. 6 is a partial cross-sectional view of an extraction section of an optics panel embodying aspects of the present invention illustrating light extracting facets of varying tilts.

As shown in FIG. 6, a cross-section exemplifying a portion of a light extraction section which may be utilized in one of the quadrants of FIG. 5 is generally shown at 134 and includes three light-extracting, redirecting facets 136, 138, 140 and an illumination surface portion 142. Each extracting facet 136, 138, 140 is oriented at a different angle, or tilt, $\theta_1$, $\theta_2$, $\theta_3$, respectively, with respect to a normal to the illumination surface 142.

Extracting facet 136 is oriented at an angle $\theta_1 = 45°$ with respect to a normal to the illumination surface 142. For this orientation, incident light, represented by the arrow labeled $I_1$, will be reflected, as represented by the arrow labeled $R_1$, in a preferred direction $\alpha_1$, approximately equal to 90°, that is substantially normal to the illumination surface 142.

Extracting facet 138 is oriented at an angle $\theta_2 < 45°$ with respect to a normal to the illumination surface 142. For this orientation, incident light, represented by the arrow labeled $I_2$, will be reflected, as represented by the arrow labeled $R_2$, in a preferred direction $\alpha_2$ that is less than 90° with respect to the illumination surface 142.

Finally, extracting facet 140 is oriented at an angle $\theta_3 > 45°$ with respect to a normal to the illumination surface 142. For this orientation, incident light, represented by the arrow labeled $I_3$, will be reflected, as represented by the arrow labeled $R_3$, in a preferred direction $\alpha_3$ that is greater than 90° with respect to the illumination surface 142.

If the orientation of the extracting facet is such that it cannot operate by total internal reflection, it may be necessary to apply a reflective coating to the surface of the redirecting surface as previously discussed.

Figure 7:
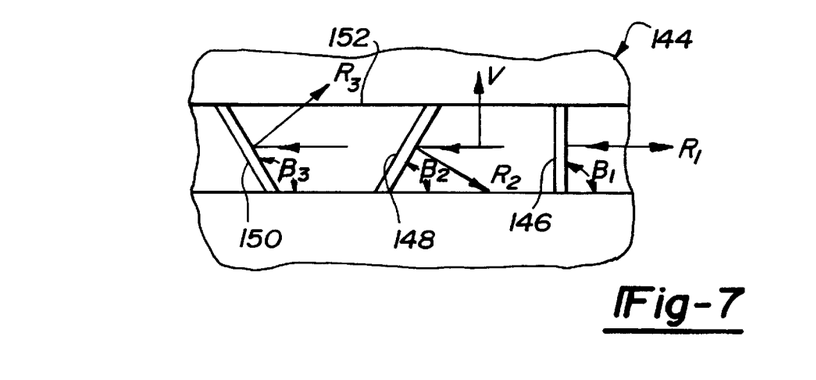
FIG. 7 is a partial plan view of an extraction section of an optics panel embodying aspects of the present invention illustrating light extracting facets of varying slants.

As can be appreciated, for example, from FIG. 5, the extracting facets formed on the back surfaces of the second light redirecting structures 110, 118, 124, and 130 define generally parallel rows of facets extending transversely across the back surfaces. As shown in FIG. 7, a portion generally shown at 144 exemplifying a back surface of a second light redirecting structure, or extraction section, may include extracting facets 146, 148, 150, generally defining a row 152 of facets. The orientation of the facets with respect to the row, i.e., the slant, may be varied so as to tailor the preferred direction of the light reflected by the facets out of the plane given in FIG. 6. For example, facet 146 is oriented at an angle, or slant, $\beta_1$, of 90° that is normal to row 152 and parallel to the vertical or V direction and reflects light with no deviation along the V direction, facet 140 is oriented at an angle, $\beta_2$ that is less than 90° with respect to the row 152 and redirects light toward the negative V direction, and facet 150 is oriented at an angle, $\beta_3$ that is greater than 90° with respect to the row 152 to redirect light towards the positive V direction.

While the illumination surface of each individual quadrant, or unit cell, of the double redirecting light pipe section 44 is preferably, but not necessarily, a planar surface, the four planar surfaces of the quadrants are not necessarily co-planar with one another. The individual quadrants, or unit-cells, may be disposed at angles with respect to one another so as to accommodate curved illumination surface requirements and/or curved packaging restrictions.

The facet tilt and slant and the angular orientation of the light extraction section may be varied to achieve tailored, non-rectangular light distribution patterns from thin light management structures whose shapes are tailored to specific, often non-planar, packaging limitations. For example, such a structure may be provided behind a vehicle signal lamp cover that is curved and have a thickness of only 30 mm behind the cover.

Figure 8:
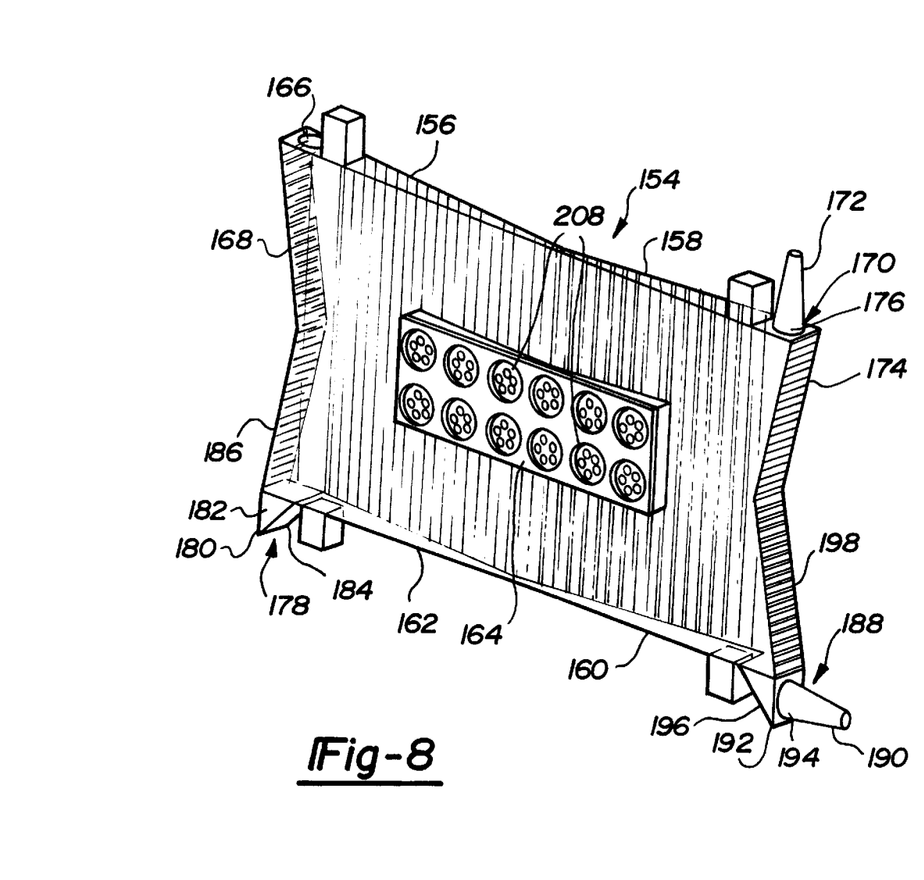
FIG. 8 is a perspective view of an alternative embodiment of a hybrid optics panel embodying aspects of the present invention which illustrates four alternative light couplings for the panel.

In the embodiment of the unit cells 52 and 54 shown in FIG. 2, the coupling optics 60, 62 preferably comprises a Fresnel lens formed on the top corner of each unit cell 52,54 for directing, shaping, and collimating the light emitted by the LEDs 56 and 58 into the first light redirecting structures 78 and 64, respectively. As shown in FIG. 8, however, a variety of light coupling approaches may be taken to directing light from a light source into a light redirecting structure. It is not always necessary that the light source directed at a light redirecting structure be collimated. The light should be conditioned so that the interaction of the light transmitted within the redirecting structure or structures with the redirecting facets achieves the desired light distribution and intensity most efficiently.

Examples of different light coupling approaches are shown in FIG. 8. A hybrid optics panel generally shown at 154 in FIG. 8 has four double redirecting quadrants, or unit cells, 156, 158, 160, 162 and a centrally located lensing section 164.

Coupling 166 of first redirecting structure 168 of unit cell 156 includes no external coupling structure. The light receiving surface may comprise a Fresnel lens as shown in FIG. 2, or another type of lens structure, such as a concave or convex lens, as determined by the lighting requirements. Alternatively, coupling 166 may comprise merely a flat, light-receiving surface having no particular light-conditioning structure formed thereon.

Coupling 170 of unit cell 158 includes a reflector cone 172 for collecting and directing light emitted from a light source into the first redirecting structure 174. A lens structure, such as Fresnel, concave, or convex, may be employed at the interface 176 of reflector cone 172 and first redirecting structure 174.

Coupling 178 of unit cell 162 includes redirecting structure 180. Light emitted by the light source enters light receiving surface 182 and is reflected off reflecting surface 184 into the first redirecting structure 186 of quadrant, or unit cell, 162. A lens structure, such as a Fresnel, concave, or a convex lens, may be employed at either or both of the light receiving surface 182 and the interface of redirecting structure 180 and first redirecting structure 186. Reflecting surface 184 may reflect light by total internal reflection, or a reflective coating, such as vacuum deposited aluminum, may be applied to surface 184.

Coupling 188 of unit cell 160 combines a reflector cone 190 with a light redirecting structure 192. Light emitted by a light source and collected and directed by the reflector cone 190 enters the redirecting structure 192 at receiving surface 194 and is reflected by reflecting surface 196 into the first redirecting structure 198 of quadrant, or unit cell, 160. Reflecting surface 196 may operate by total internal reflection or, alternatively, may be coated with a reflective coating to improve the reflectivity thereof. A lens structure, such as a Fresnel, concave, or a convex lens, may be employed at the light receiving surface 194, or at the interface of redirecting structure 192 with first redirecting structure 198.

As can be appreciated, light coupling structure and optics can be constructed and arranged to accommodate a variety of light source positions and incident angles. In addition, although the light coupling structures and optics shown in FIG. 8 accommodate light sources which emit light generally within a plane defined by panel 154, it can be appreciated that the coupling structure and optics could be configured to accommodate out-of-plane light sources. Light coupling flexibility allows for overall packaging and installation flexibility of the system.

Figure 9:
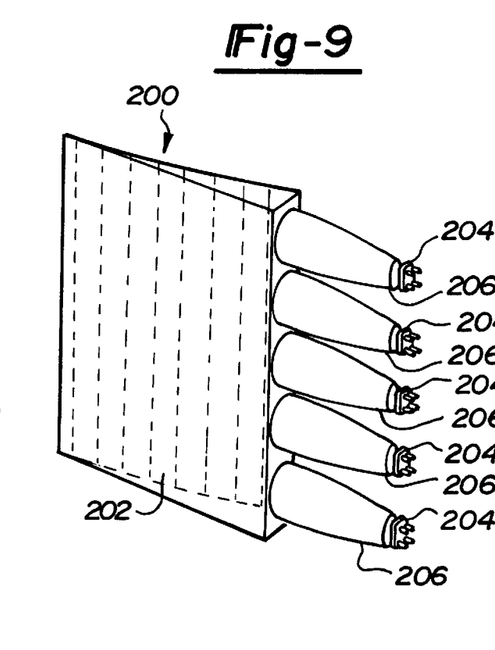
FIG. 9 is a perspective view of a single redirecting optics panel employing light sources and light coupling optics at a side edge thereof.

A light redirecting light pipe section may comprise more or less than two light redirecting structures. For example, as shown in FIG. 9, light redirecting light pipe shown at 200 includes only a single light redirecting structure 202 and is edge-lit by a plurality of edge-mounted LEDs 204 coupled with corresponding reflector cones 206. Edge-lighting of a redirecting light pipe may also take other forms such as directing the light emitted from a light source at the edge of the panel without the use of reflector cones or by using reflector cones combined with fiber optic cables or other combinations of lensing and/or light pipes.

Optics panel 154 shown in FIG. 8 includes a lensing section 164 having an array of individual lenses 208 for coupling with a backlight matrix, preferably comprising a corresponding number of LEDs mounted on a similarly oriented matrix. As can be appreciated by comparing FIGS. 5 and 8, the orientation and number of individual lenses in the lensing section may be varied and the overall shape of the lensing section may be varied as well. Alternatively, as shown in FIGS. 2 and 9, a direct emitting lensing section may be omitted altogether.

The type of optics employed for the individual lenses of the lensing section may also be varied. The individual lenses may be concave, convex, Fresnel, or other types of lenses. In the embodiment illustrated in FIG. 8, lenses 208 are Fresnel lenses. It is not necessary that all lenses of a particular lensing section be the same type of lens, i.e., the type of lens may be varied within the lensing section. In addition, it is not necessary that all individual direct emitting lenses be grouped in a single contiguous lensing section. The individual direct emitting lenses may be spread throughout the hybrid optics panel as individual lenses or subgroups of lenses.

In a direct lensing section or sections, light is transmitted substantially directly through the optics structure without significant redirection. In addition, the amount of light spreading that occurs in the direct lensing section(s) is relatively small when compared with the substantial spreading which may take place in a double redirecting light pipe section such as described above. Thus, it can be readily appreciated that the intensity of light emitted from the direct lensing section will typically be substantially greater than the intensity of light emitted from a redirecting light pipe section.

In a vehicle signal lamp application of a thin light managing system of the present invention, such as that shown in FIG. 1, the relatively high intensity direct lensing section 42 may be used to illuminate a stop/turn portion as shown at 43 of the signal lamp cover lens 22, and the relatively low intensity double redirecting light pipe section 44 surrounding the lensing section 42 may be used to illuminate a running light portion as shown at 45 of the signal lamp cover lens 22.

Figure 10:
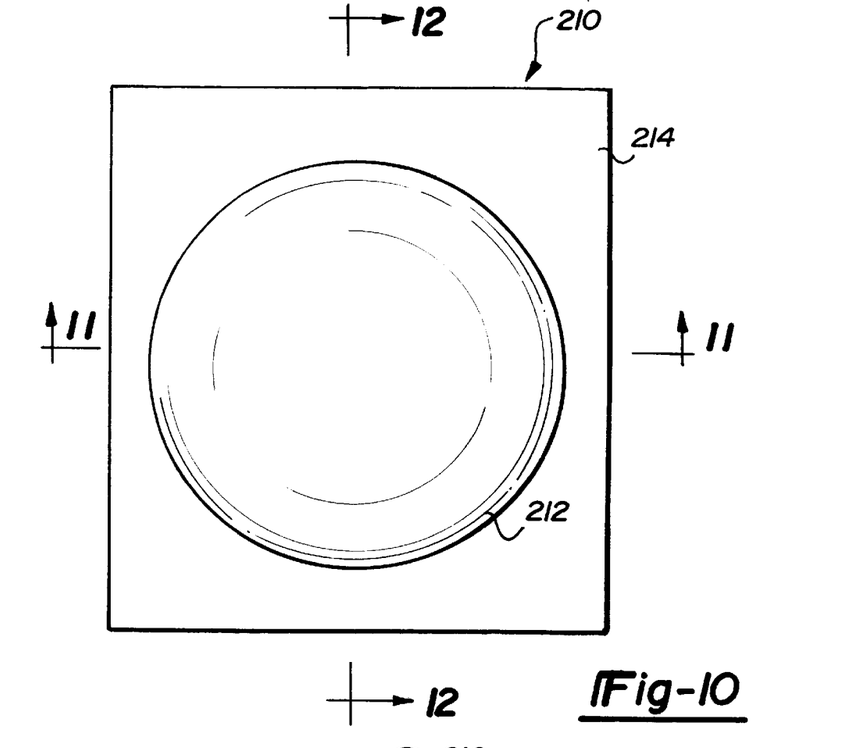
FIG. 10 is a plan view of a dual surface lens element which may be employed in the thin light-managing system embodying aspects of the present invention.
Figures 11, 12:
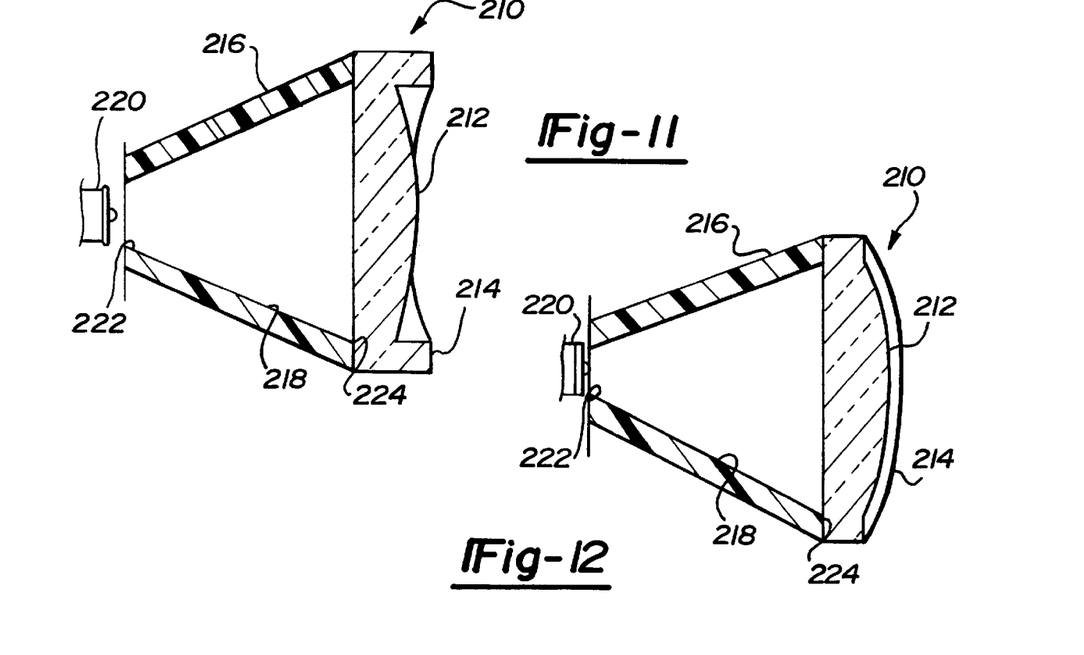
FIG. 11 is a cross-sectional view taken along the line 11—11 of FIG. 10.
FIG. 12 is a cross-sectional view taken along the line 12—12 of FIG. 10.

A particularly advantageous direct emitting lens structure for use in the lensing section of a hybrid optics panel is shown in FIGS. 10–12. A lens element as shown at 210, referred to as a dual surface lens, includes a partial spherical surface 212 embedded within and superimposed upon a partial cylindrical surface 214. The lens 210 is preferably molded of a suitable optics quality plastic material.

As shown in FIG. 10, the dual surface lens 210 is preferably square in its plan view. Lens 210 is preferably coupled with a square reflector cone 216, as shown in FIGS. 11 and 12, having a reflective inner surface 218, and an LED 220 is centered inside an entrance aperture 222 of the reflector cone 216. The light receiving surface of lens 210 at the exit aperture 224 of the cone 216 is preferably flat. In the preferred embodiment, the entrance and exit reflector cone apertures 222,224 are 3.7 and 10.8 mm square, respectively, and the length of the cone 216 is 10 mm. Each lens 210 is preferably oriented within a hybrid optics panel so that the axis of cylindrical surface 214 is horizontal.

The dual surface construction redirects light horizontally and vertically. The redirection pattern can be varied by varying the structure of the lens 210, for example by varying the radius of curvature of either or both of the spherical portion 212 and cylindrical portion 214 of the lens 210. In the preferred embodiment, the radius of curvature of the spherical portion 212 is 16.8 mm and the radius of curvature of the cylindrical portion 214 is 11.9 mm.

Figures 13, 14:
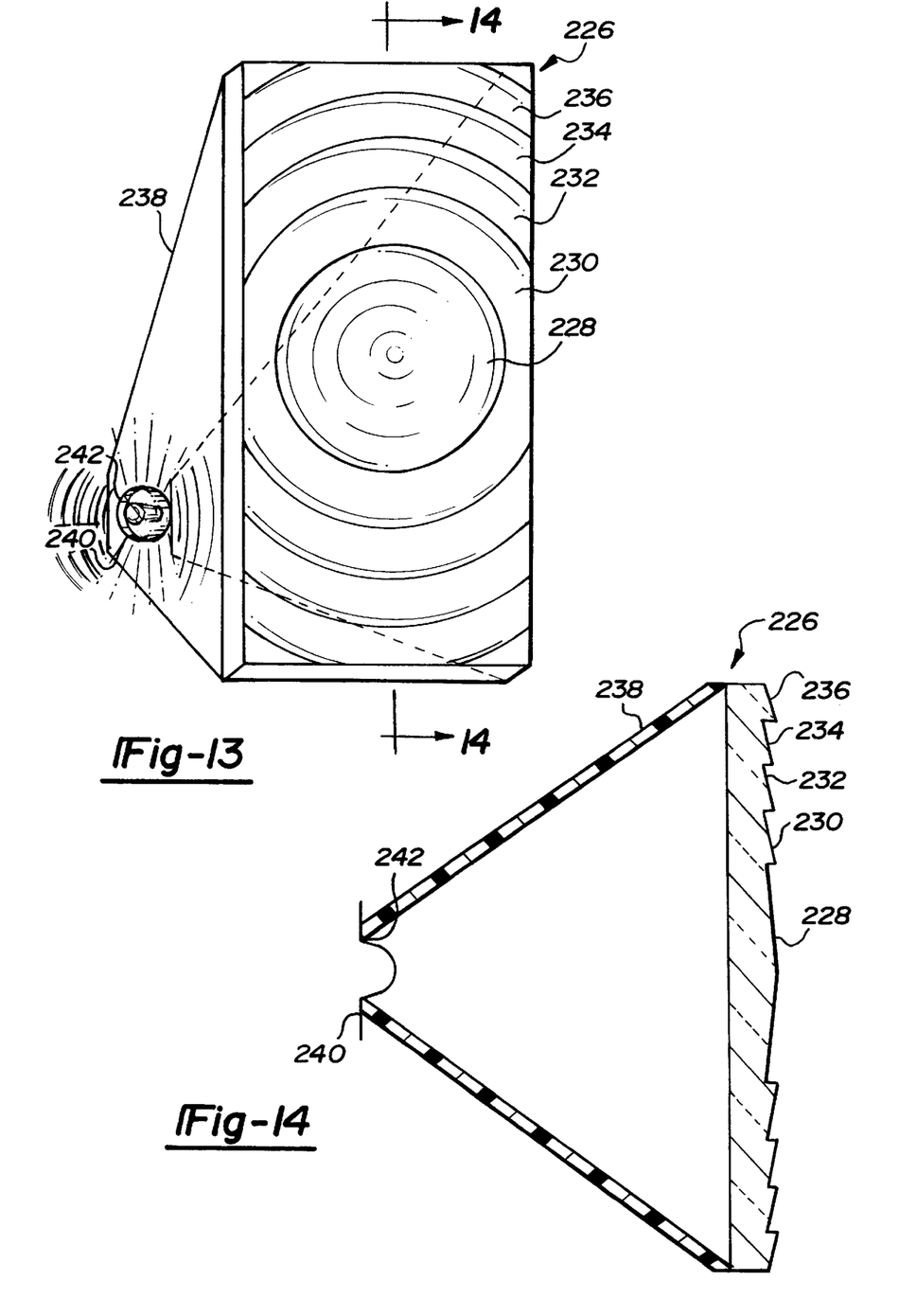
FIG. 13 is a perspective view of a tailored Fresnel lens element which may be employed in a thin light-managing system embodying aspects of the present invention.
FIG. 14 is a cross-section of the tailored Fresnel lens element taken along line 14—14 of FIG. 13.

Another advantageous direct emitting lens structure for use in the lensing section of a hybrid optics panel is shown in FIGS. 13 and 14. A tailored variable focal length Fresnel lens element is shown at 226 having a 2:1 height to width aspect ratio is shown. Lens 226 includes a circular center portion 228, which comprises a portion of a sphere, and a plurality of concentric rings progressing outwardly from portion 228.

In the illustrated embodiment, the lens has four rings 230,232,234,236. The top surface of the lens 226 has a rotationally symmetric profile, and each facet, defined by a single ring, has a different focal length. The focal length of a ring of the lens 226 is preferably given by the equation:

$$f = f_{start} + (f_{stop} - f_{start})(r/r_{stop})^n$$

Where:
 f=focal length at a given Fresnel ring defined by radius r;
 $f_{start}$=focal length at the spherical center facet;
 $f_{stop}$=focal length at the outer Fresnel ring;
 $r_{stop}$=radius of the outer Fresnel ring; and
 n=exponential interpolation factor.

For the preferred embodiment overall dimensions of the lens are 30 mm×15 mm and $f_{start}$=45 mm, $f_{stop}$=90 mm, and $r_{stop}$=15 mm and n=2. Lens 226 is preferably coupled with a cone 238 having a rectangular cross-sectional shape and an LED 240 disposed at the entrance aperture 242 of the cone 238. In the preferred embodiment, cone 238 has a length of 20 mm.

Figure 15:
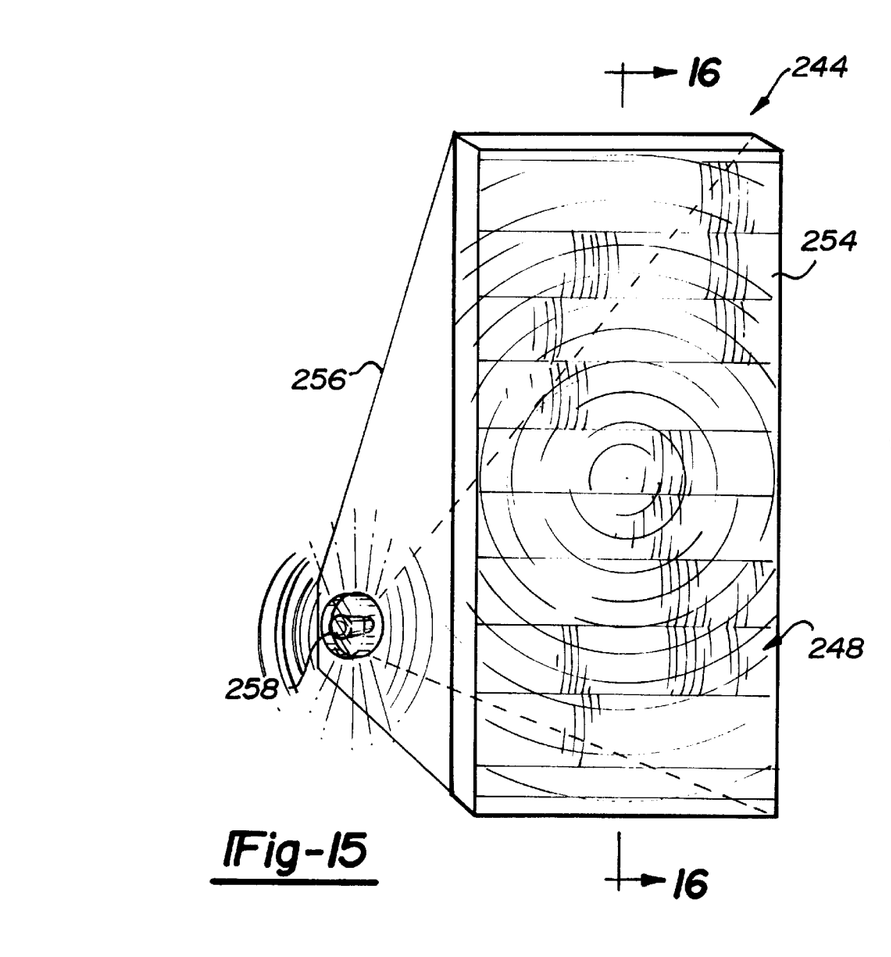
FIG. 15 is a perspective view of a Fresnel lens-pillow lens element which may be employed in the thin light-managing system embodying aspects of the present invention.
Figure 16:
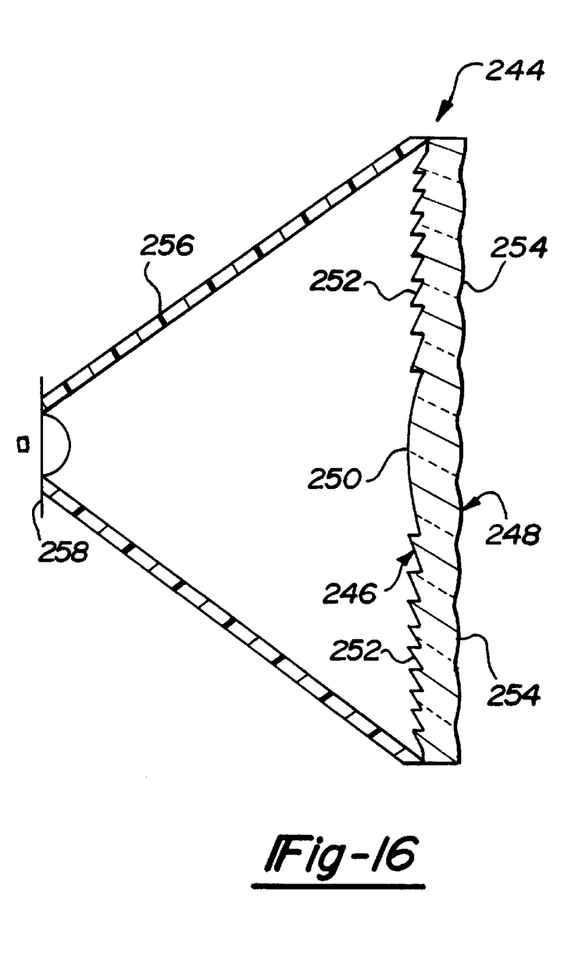
FIG. 16 is a cross-section of the Fresnel lens pillow lens element taken along line 16—16 of FIG. 15.

Another advantageous direct emitting lens structure for use in the lensing section of a hybrid optics panel is shown in FIGS. 15 and 16. A Fresnel-pillow lens element 244 includes a collimating Fresnel inner surface 246 and an arrayed pillow lens outer surface 248. Inner Fresnel surface 246 is defined by a central spherically shaped facet 250 and a plurality of Fresnel rings 252, having constant focal length, progressing outwardly from the center facet 250. The faceted surface of Fresnel inner surface 246 is rotationally symmetric. Outer pillow lens surface 248 is defined by an array of pillow lenses 254. The outer Fresnel surface 248 collimates incoming light and the pillow surface 248 spreads the light.

The profile of each individual pillow lens 254 is rotationally symmetric and has a slight hyperbolic shape. An asymmetric output distribution is created by altering the horizontal-to-vertical aspect ratio for each individual pillow lens.

For the preferred embodiment the overall dimensions of the Fresnel-pillow lens element 240 is 30 mm by 15 mm. The Fresnel lens inner surface 246 has a focal length of 21.5 mm. Each pillow lens 254 has an aperture of 3 mm by 1.5 mm and a profile that is slightly hyperbolic (conic constant of −1.25) with a vertex radius of curvature of 3.1 mm. A reflector 256 has a length of 20 mm and an LED 258 is disposed at the entrance aperture as previously described.

Figure 17:
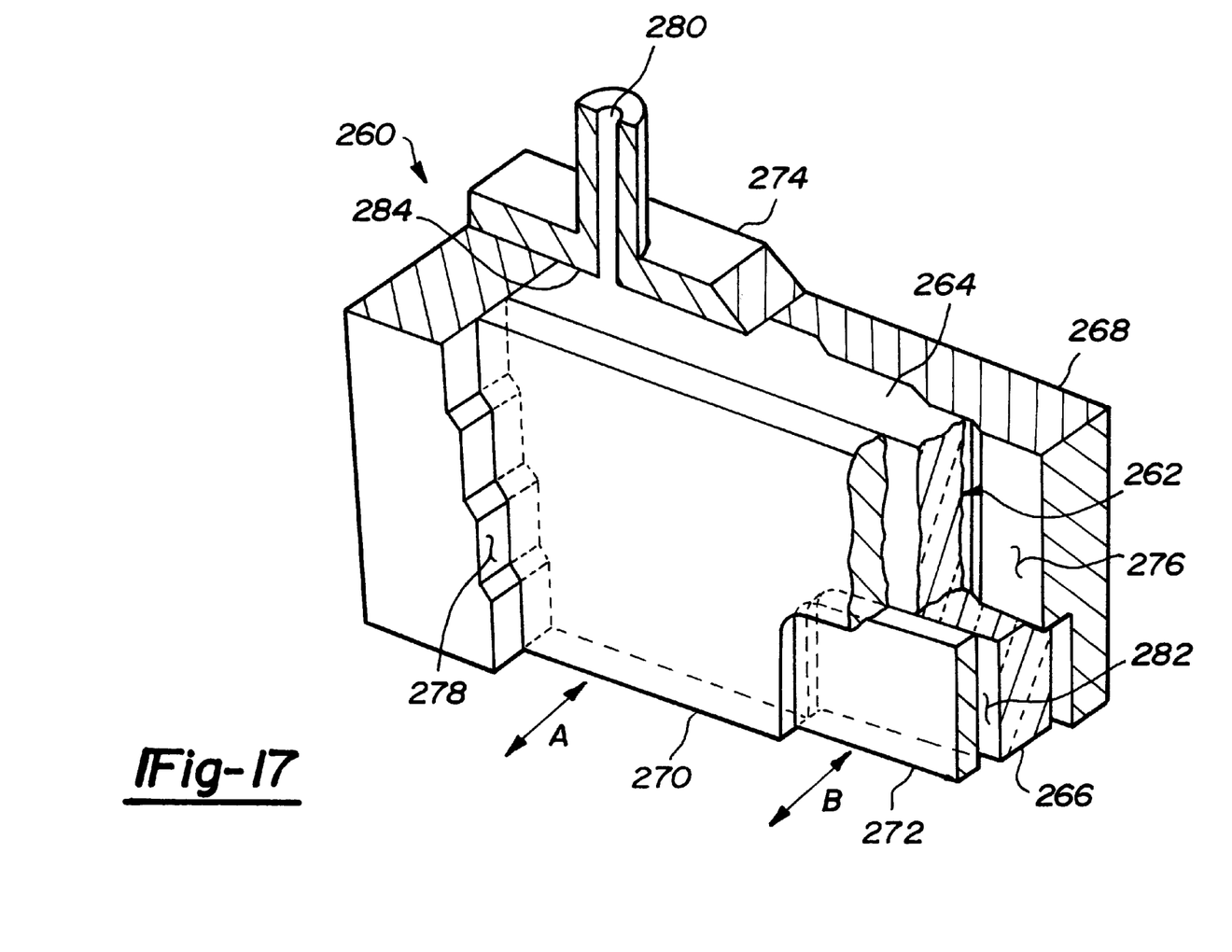
FIG. 17 is a partial cross-sectional view of an injection molding arrangement for forming an optics element embodying aspects of the present invention.

In a vehicle signal lamp application of a thin light managing system of the present invention, such as that shown in FIG. 1, an injection molding arrangement for forming a hybrid optics panel in accordance with the present invention is generally indicated by reference number 260 in FIG. 17. Shown in FIG. 17 is approximately one quarter of one embodiment of a full molding arrangement and one-quarter of the hybrid optics panel formed therein. The hybrid optics panel formed by the injection molding arrangement 260 is indicated generally by reference number 262, one quadrant of a redirecting light pipe section is indicated generally by reference number 264 and one quarter of a central lensing section is indicated generally by reference number 266.

The illustrated molding arrangement 260 includes a fixed mold portion 268, an outer movable mold portion 270, and an inner movable mold portion 272. Outer movable mold portion 270 and inner movable mold portion 272 are both independently movable with respect to the fixed mold portion 268 and with respect to each other in the directions indicated by arrows "A" and "B", respectively. A top portion 274 is also provided.

Fixed mold portion 268 includes a surface facet forming surface 276 shaped so as to form light redirecting facets of the desired number, shape, and orientation on the back face of redirecting light pipe section 264, so as to form a second, or extraction, light redirecting structure. An edge facet forming surface 278, formed on an inwardly facing end wall of the fixed mold portion 268, is shaped so as to form light redirecting facets along an edge of the redirecting light pipe section 264 in the desired number, size, and orientation so as to form a first, or TIR, light redirecting structure so as to form a first light redirecting structure.

The injection molding arrangement 260 also includes an injection port 280 preferably extending through top portion 274 and preferably located at a relatively thick portion of the redirecting light pipe section 264. Injection port 280 communicates with a molding cavity defined by fixed mold portion 268, inner and outer mold portions 272 and 270, and top portion 274.

The make-up of a complete injection molding arrangement according to the present invention will vary depending on the design of the thin light managing optics structure to be formed. One or more movable portions, such as inner and outer movable portions 272 and 270, may be included in the arrangement. For example, a full injection molding arrangement for forming an entire hybrid optics panel, such as those shown in FIGS. 1, 5, and 8, would preferably include four quadrants, such as that shown in FIG. 17, formed integrally with one another and would also preferably include an injection port in each of the quadrants. On the other hand, a hybrid optics panel such as that shown in FIG. 2 would preferably be formed using two molding quadrants, such as that shown in FIG. 17. An optics panel such as that shown in FIG. 9 would preferably be formed using one molding quadrant, such as that shown in FIG. 17, also with no inner movable portion 272.

In operation, outer movable mold portion 270 is applied against the non-faceted portion of the redirecting light pipe section 264, or the front illumination surface. Thus, a molding surface of outer movable mold portion 270 would preferably be flat and smooth. The inner movable mold portion 272 is shaped and oriented so as to form the lensing portion 266 of the optics panel 262. Thus, a molding surface of inner movable mold portion 272 and/or mold surface 282 of fixed mold portion 268 would be structured so as to form lens structures of the direct lensing section 266, such as concave, convex, or Fresnel lenses, or one or more of the above-described dual surface lens elements, tailored Fresnel lens elements, or Fresnel-pillow lens elements. Moreover, molding surface 284 of top portion 274 may be constructed and arranged to form appropriately located coupling optics structures on the top edge of the optics panel 262. Alternatively, or in addition, an inwardly facing end wall of fixed mold portion 268 may be constructed and arranged to form appropriately located coupling optics structure(s) along a side edge of optics panel 262.

The optics panel 262 is formed by a unique and improved compression-injection molding technique. Molten material is injected through injection port 280 into the mold cavity defined by the fixed mold portion 268, the movable portions 270 and 272, and top portion 274. After the mold cavity is substantially filled with the molten material, and during the material curing period, a controlled amount of pressure may be applied at the outer and inner movable portions 270, 272 independently from one another. Not only may the amount of pressure be controlled, but the amount of displacement of each movable portion may also be independently controlled. The duration of the applied pressure at each movable mold portion is also preferably independently controllable. The pressure eliminates gaps in the molten material and causes the molten material to more accurately fill the shaped surfaces of the molding cavity. Pressure also eliminates sag which can occur at relatively thicker portions of the molded piece due to curing time variations through the thickness of the piece.

Independent control of pressure and displacement, as well as duration of pressure application, of one or more movable mold portions enables true injection molding of articles, such as the hybrid optics panels of the present invention, having complex geometries, including thick and thin sections in the same relative areas and drastic transitions from one geometry to the next as exemplified in the preferred embodiment of the present invention of FIG. 1.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the scope of the appended claims the invention may be practiced otherwise than as specifically described.

What is claimed is:

1. A light managing system for use in a vehicle comprising:
   a signal lamp assembly having a housing and a cover lens coupled to said housing forming an envelope there between;
   a hybrid optics panel enclosed within said envelope between said housing and said cover lens; said hybrid optics panel including a direct lensing section for emitting light directly through said panel in a predetermined first pattern and a redirecting light pipe section for redirecting light through said panel in a predetermined second pattern different from said first pattern;
   a first light source positioned between said housing and said hybrid optics panel for emitting light into said direct lensing section; and
   a second light source connected to said optics panel for emitting light into said redirecting light pipe section, wherein the light from said second light source is redirected in said second patterns through said redirecting light pipe section to illuminate a generally planar front surface of said optics panel.

2. A light managing system as set forth in claim 1 wherein said redirecting light pipe section includes a first light redirecting structure having a plurality of spaced apart redirecting facets for redirecting the light from said second light source into the redirecting light pipe section of said optics panel coplanar to said front illumination surface.

3. A light managing system as set forth in claim 2 wherein said redirecting light pipe section includes a second light redirecting structure having a plurality of spaced apart redirecting facets arranged transverse to said facets of said first light redirecting structure for redirecting the light reflected from said first redirecting structure outwardly in said second pattern through said front illumination surface.

4. A light managing system as set forth in claim 3 wherein said redirecting light pipe section includes a plurality of quadrants integrally formed about said direct lensing section to form a solid body optics panel.

5. A light managing system as set forth in claim 4 further including a second light source associated with each of said quadrants of said redirecting light pipe section for redirecting light through said light pipe section and illuminating said front surface.

6. A light managing system as set forth in claim 5 wherein each of said second light sources is coupled to one of said respective quadrants to emit light generally coplanar to said front illumination surface toward said facets of said first light redirecting structure.

7. A light managing system as set forth in claim 6 wherein said facets of at least one of said first and second light redirecting structures are separated by flat sections.

8. A light managing system as set forth in claim 7 further including a plurality of first light sources secured in a mounting substrate to define an array of light sources, said mounting substrate positioned between said housing and said direct lensing section.

9. A light managing system as set forth in claim 8 wherein said direct lensing section includes an array of individual lenses corresponding with said array of first light sources.

10. A light managing system as set forth in claim 9 further including a reflector matrix positioned between said mounting substrate and said direct lensing section; said reflector matrix having a plurality of reflector cones corresponding with said plurality of lenses and said first light sources for shaping the light emitted from said first light sources into said lenses.

11. A light managing system as set forth in claim 10 wherein said cover lens includes a curved front surface.

12. A light managing system as set forth in claim 11 wherein said optics panel includes a contoured solid body optics panel generally corresponding to said curved front surface of said cover lens.

13. A light managing system as set forth in claim 12 further including an electronic control module for controlling the operation of said first and second light sources.

14. A light managing system as set forth in claim 13 wherein said first and second light sources include at least one light-emitting diode.

15. A light managing system as set forth in claim 14 wherein said hybrid optics panel is formed of molded acrylic/PMMA.

16. A hybrid optics panel for redirecting light emitted from a light source to an illumination surface comprising:

a double redirecting light pipe having a first light redirecting structure and a second light redirecting structure forming an integral solid body having a front illumination surface;

said first light redirecting structure forming a generally elongated wedge-shaped section having a plurality of spaced apart facets defining a step-shaped outer edge for redirecting light emitted from the light source generally coplanar to said front illumination surface;

said second light redirecting structure forming a panel section having a generally laterally extending elongated wedge-shaped cross-section and a plurality of space apart facets defining a step-shaped outer surface; and said facets of said second light redirecting structure aligned generally transverse to said facets of said first light redirecting structure for redirecting light reflected from said facet of said first light redirecting structure outwardly to said front illumination surface.

17. A hybrid optics panel as set forth in claim 16 wherein said facets of one of said first and second light redirecting structures include a central flat portion extending between said front illumination surface and said outer surface and a curved portion adjacent at least one side of said central flat portion for dispersing the light emitted from the light source along a predetermined angular pattern into said second light redirecting structure.

18. A hybrid optics panel as set forth in claim 17 wherein said facets of at least one of said first and second light redirecting structures are separated by flat sections.

19. A hybrid optics panel as set forth in claim 18 further including a coupling optics lens coupled to a distal end of said first light redirecting structure for generally collimating the light emitted from the light source into said first light redirecting structure.

20. A hybrid optics panel as set forth in claim 19 wherein said panel includes a plurality of first and second light redirecting structures defining unit cells to form a solid body optics panel.

21. A hybrid optics panel as set forth in claim 20 wherein said unit cells forming said optics panel are coplanar.

22. A hybrid optics panel as set forth in claim 20 wherein said unit cells forming said optics panel are non-planar.

\* \* \* \* \*